June 5, 1923.
C. H. DREHER
1,457,352
APPARATUS FOR CONVEYING AND SPACING ARTICLES
Filed Jan. 16, 1922    2 Sheets-Sheet 1
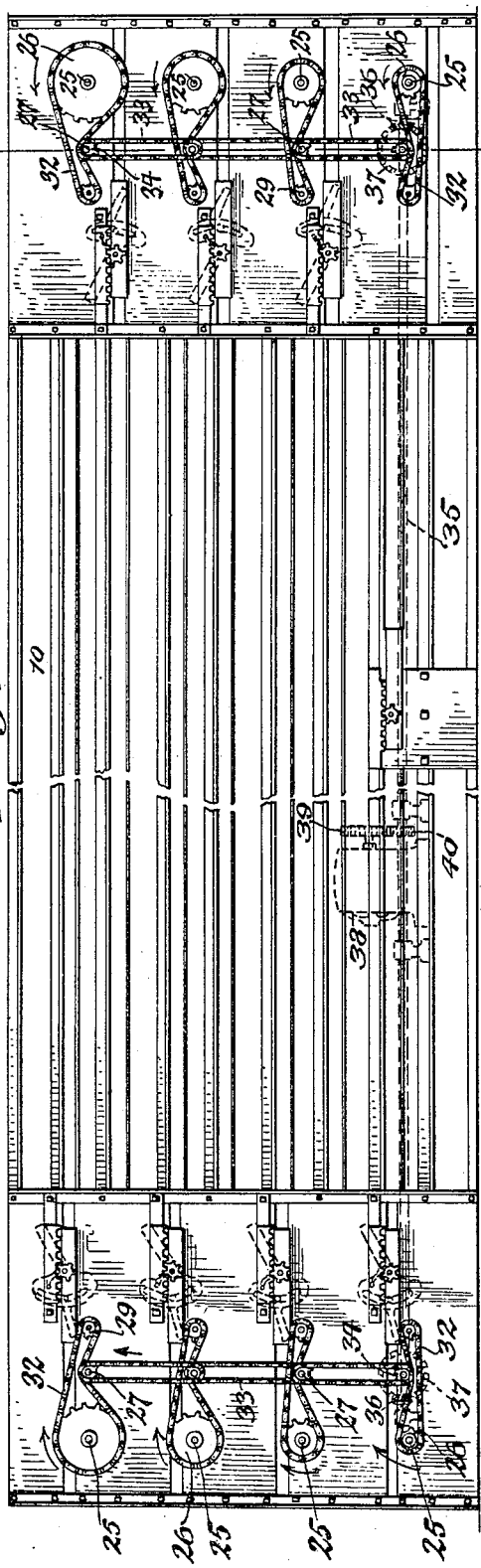
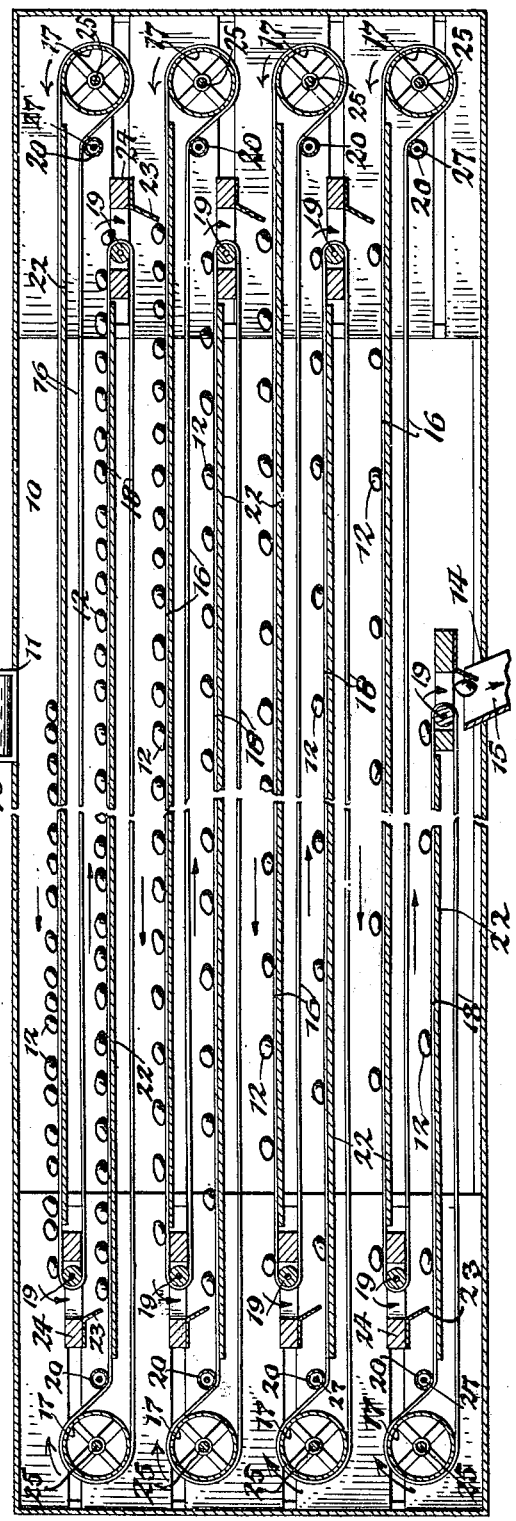

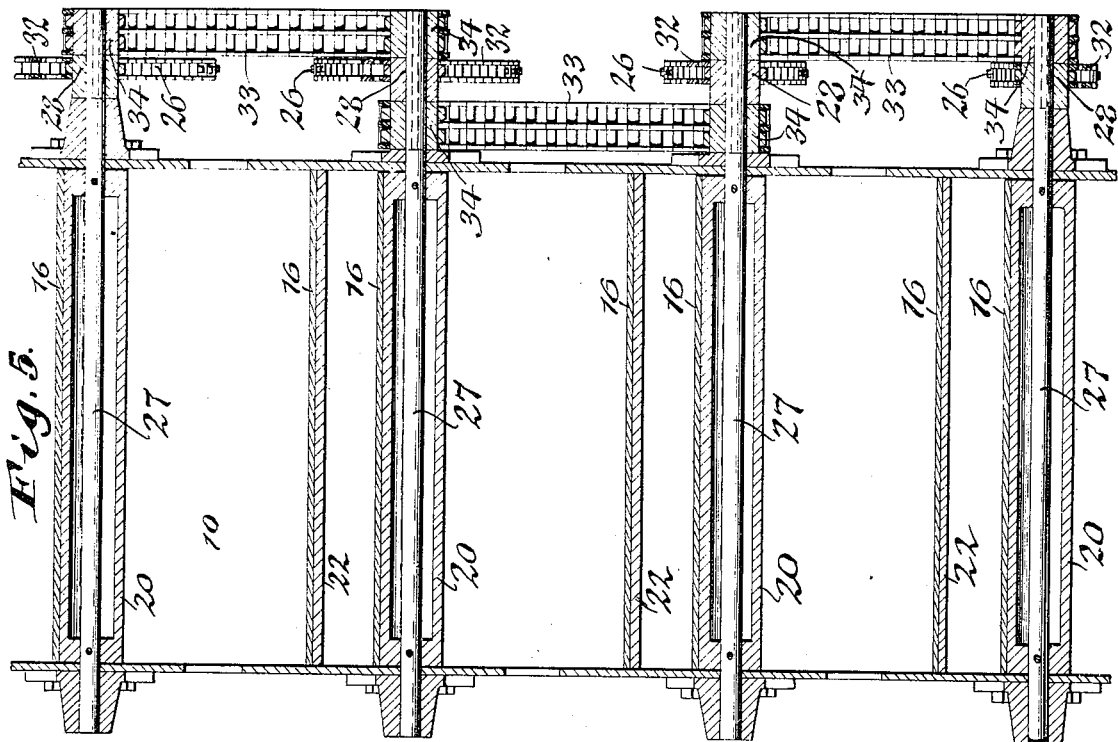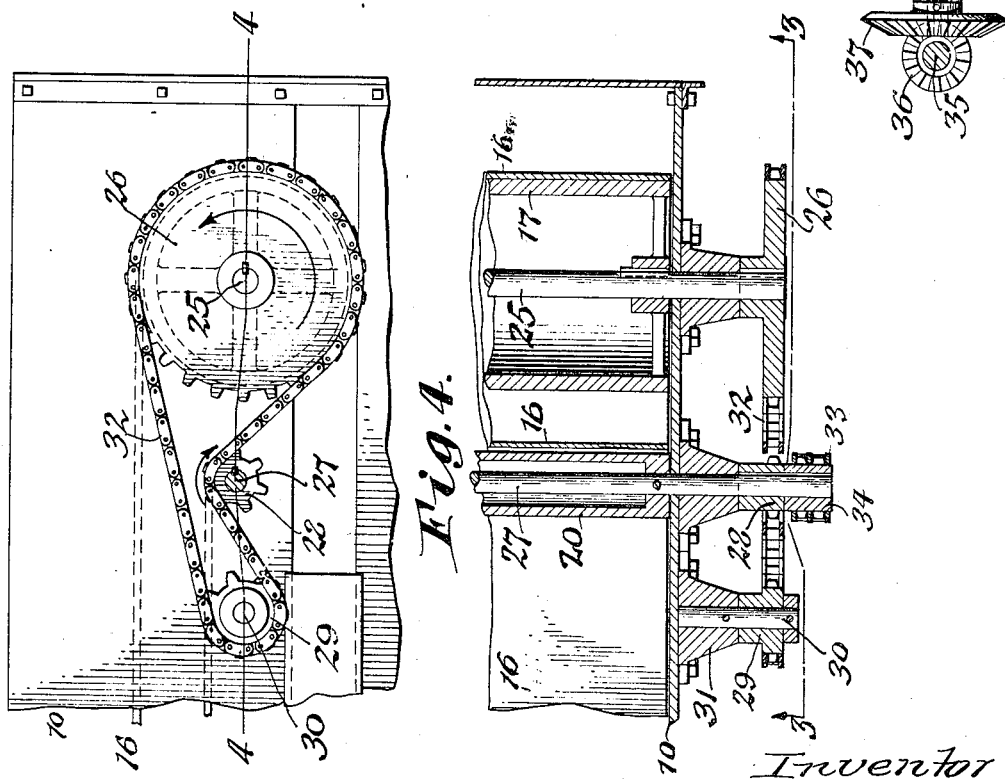

Patented June 5, 1923.

1,457,352

UNITED STATES PATENT OFFICE.

CHARLES H. DREHER, OF BUFFALO, NEW YORK.

APPARATUS FOR CONVEYING AND SPACING ARTICLES.

Application filed January 16, 1922. Serial No. 529,502.

*To all whom it may concern:*

Be it known that I, CHARLES H. DREHER, a citizen of the United States, residing at Buffalo, in the county of Erie and State of New York, have invented new and useful Improvements in Apparatus for Conveying and Spacing Articles, of which the following is a specification.

This invention relates to an apparatus for conveying and spacing articles with gradually increasing distances between the articles in successive parts of the path of the same, such an apparatus being particularly desirable in propelling loaves of dough through a proofer after the same have been received from a scale and rounder and before they are delivered to a kneader and molder preparatory to baking the same in an oven.

In proofers as heretofore constructed, the loaves of dough have been conveyed through the same at a uniform rate of speed with the result that when two loaves of dough were deposited too close together on the conveyer in the proofer, these loaves would remain in this relative position and be discharged simultaneously into the kneader, thereby producing a double loaf which necessitated again dividing and weighing the same before going to the oven and thus ential loss of time and increase the cost of production accordingly.

It is the object of this invention to provide a mechanism whereby the loaves of dough are conveyed through the proofer with successively increasing speed and in such manner that the distance or space between the loaves is increased in successive parts of their course through the same, so that if loaves are deposited too close together on the conveyer at the inlet of the machine, the same will be spread apart a sufficient distance by the time they reach the outlet of the same that the possibility of two loaves entering the kneader and molder at the same time is positively prevented, and thereby avoid the objectionable dividing and reweighing above referred to.

In the accompanying drawings: Figure 1 is a side elevation of a proofer for loaves of bread dough equipped with my invention. Figure 2 is a vertical longitudinal section of the same. Figure 3 is a fragmentary side elevation, on an enlarged scale, of the speed determining mechanism associated with each of the conveyer belts. Figure 4 is a horizontal section taken on line 4—4, Fig. 3. Figure 5 is a vertical transverse section, on an enlarged scale, taken on line 5—5, Fig. 1, Similar characters of reference indicate corresponding parts throughout the several views.

Although this invention is applicable to various uses, the same is shown in the present instance embodied in a proofer which is used in bakeries and in which loaves of bread dough are transported through a chamber at a suitable temperature and for a sufficient period of time to permit the dough to set or undergo the required chemical change to produce light and nutritious bread when subsequently baked in an oven. In its general organization this proofer comprises an enclosed chamber 10 which is provided in its top with an inlet 11 through which the previously divided lumps, balls or loaves 12 of dough are delivered into the chamber by a supply chute 13 from a scale and rounder while the bottom of this chamber is provided with an outlet 14 through which the treated lumps or loaves of dough are discharged by a delivery chute 15 to a kneader and molder, preparatory to being baked in an oven.

Within this chamber are arranged a plurality of conveyers 16, 18, which preferably have the form of endless belts or aprons and are so mounted that each conveyer belt has an upper horizontal operative stretch and a lower horizontal idle stretch. These conveyer belts are arranged in two sets or groups, the belts of one set alternating with those of the other set, and the several belts being so disposed that the inner turns of each upper belt stops short of the outer turn of the next lower belt, and the lower idle stretch of each upper belt is spaced apart by a horizontal longitudinal runway or path from the upper operative stretch of the next lower stretch through which the loaves are propelled during the operation of proofing or treating the same. Each of the conveyer belts passes with its outer turn around a comparatively large pulley 17 and with its inner turn around a comparatively small pulley 19. The upper and lower stretches of these conveyer belts are arranged horizontally, this being accomplished in the right hand set of belts by arranging the large and small pulleys 17 and 19 of each of these belts so that their upper sides are horizontally in line and providing a deflecting pulley 20 which engages with the underside of the lower stretch adjacent to the respective large pulley 17 and has its upper side arranged horizontally in line with the underside of the companion small pulley 19, and in the case of each conveyer belt of the left hand set this is accomplished by arranging the underside of the large and small pulleys of the same horizontally in line and providing a deflecting pulley or roller 20 which engages with the upper side of the upper stretch of this belt and has its underside arranged horizontally in line with the companion small pulley. Each of the belts is so driven that its upper operative stretch moves inwardly and in the case of an upper belt the same moves toward the receiving turn of the belt next below the same.

The lumps, balls or loaves of dough as they leave the scale and molder are directed by the supply chute upon the upper operative stretch of the uppermost conveyer belt and are carried by the latter inwardly and discharged from the inner turn or tail of this belt upon the upper operative stretch of the next lower conveyer belt which latter moves inwardly in the opposite direction from the uppermost conveyer belt. Upon reaching the inner turn of the second conveyer belt, the loaves are dropped therefrom onto the upper stretch of the third conveyer belt adjacent to the receiving end of the same, whereby the loaves are again carried in a reverse direction. In like manner the loaves are deposited successively on the upper operative stretches of each of the belts from the tail end or turn of the belt immediately above the same, whereby the loaves are carried horizontally alternately in opposite directions and take a zig-zag path from the top to the bottom of the machine and are finally discharged from the delivery turn of the lowermost conveyer belt onto the discharge chute which directs the loaves to the kneader and rounder, or elsewhere as desired.

During this course of the dough loaves through the chamber, the same undergo the chemical action which is generally known as "proofing" and prepares the same for the next following operation of kneading and molding the same into shape preparatory to entering the bake oven.

In order to prevent the operative stretches of the conveyer belts from sagging under the weight of the loaves, these stretches are supported on their under sides by shelves 22 which are mounted on the main frame of the machine in any suitable manner. As the loaves are discharged from the tail end of each conveyer belt, the same are also directed downwardly by a deflector 23 arranged on an adjacent cross bar 24 of the main frame.

Heretofore the several conveyer belts of both sets have been operated at the same speed with the result that when two lumps of dough were deposited too close together on the uppermost belt that the same would remain in this relative position during the passage of the same through the proofer and then be simultaneously discharged into the kneading and molding machine, thereby producing the objectionable double lump or ball of dough previously mentioned.

In order to avoid delivering two lumps of dough at a time into the kneader and molder, means are provided whereby the loaves, lumps or balls of dough are separated progressively greater distances from each other from the time they enter the proofer until they leave the same, thereby avoiding extra working in again dividing these double loaves and reweighing them before going to the oven.

The preferred means for accomplishing this are constructed as follows:

Each of the large pulleys 17 in this instance is the driven pulley whereby the respective conveyer belt is operated, this pulley being mounted on a driven shaft 25 which is journaled horizontally and transversely in suitable bearings on the main frame and having its front end projecting forwardly beyond the front side thereof. Upon the front end of each of these driven shafts is secured a driven sprocket wheel 26 which may be of any suitable construction. Each of the deflecting pulleys 20 is secured to a horizontal countershaft 27 which is journaled in suitable bearings on the main frame which is provided on its front end which extends forwardly from the front side of the main frame with a driving sprocket wheel 28. On that side of each driving sprocket wheel opposite to the driven sprocket wheel 26 an idle sprocket wheel 29 is arranged, the latter being journaled on a stationary pivot or stud 30 which is mounted by a bracket 31 on the adjacent part of the main frame or wall of the machine, as best shown in Fig. 4. Motion is transmitted from each driving sprocket wheel 28 to the companion driven sprocket wheel 26 by a speed determining sprocket chain belt 32 which passes with opposite turns around the driven sprocket wheel 26 and the companion idle sprocket 29 while the intermediate part of one of its stretches passes around the respective driving sprocket wheel 28. The several driving sprocket wheels 28 of both sets of conveyer belts are of the same diameter and rotated at the same speed so that the rate of travel of the several sprocket chain belts 32 is the same. The diameter of the driven sprocket wheels of each set are of successively smaller diameter from the uppermost sprocket wheel 26 to the lowermost and the diameters of the driven sprocket wheels 26 of both sets of conveyer belts are alternately of successively smaller diameter. For instance, the driven sprocket wheel of the uppermost conveyer belt which is arranged at the right hand side of the machine in Fig. 1 may be of a diameter to make 40 revolutions per minute, the driven sprocket which is arranged at the left hand side of the machine for driving the conveyer belt next below the uppermost may be of a diameter to make 44 revolutions per minute, the driven sprocket wheel which is arranged at the right hand side of the machine for driving the next lower conveyer belt may be of a diameter to make 50 revolutions per minute, and so on, each successively lower conveyer belt having a driven sprocket wheel 26 which is of smaller diameter than the preceding upper belt. Due to this driving mechanism, the uppermost conveying belt will travel at the slowest speed, the next lower conveyer belt will travel somewhat faster, the third conveyer belt from the top of the tier will travel still faster, and so on to the lowermost conveyer belt, each lower conveyer belt traveling faster than the one above the same.

It follows from this construction that when lumps, loaves or balls of dough are placed too close together on the uppermost conveyer belt these loaves upon being delivered successively on the next lower conveyer belt which travels at a higher speed will cause these loaves to be spaced farther apart on the latter as compared with the relative distance between these loaves while they were on the uppermost conveyer belt, because the next lower belt by reason of its greater speed gains on the next upper conveyer belt during the interval of time which elapses between the transfer of one loaf to the transfer of the next loaf from the upper conveyer belt to the next lower conveyer belt. This gain in distance occurs upon transferring the loaves to each succeeding conveyer belt and is progressively greater during each transferring operation so that there is an increasing gap or space between adjacent loaves in the train or stream of loaves from the time the same are fed into the inlet of the machine to the time they are discharged from the outlet thereof. The relative speed of these conveyer belts is preferably such that when the loaves issue from the machine they are spaced apart sufficiently far that there is no liability of more than one loaf at a time being delivered from the lowermost conveyer belt onto the kneader and molder.

Any suitable means may be employed for driving the several driving sprockets so that they rotate in unison and at the same speed, those shown in the drawings being preferred and comprising a plurality of operating sprocket chain belts 33 arranged in two upright series and each of which passes with its opposite turns around operating sprocket wheels 34 secured to two adjacent countershafts 37. The series of operating sprocket chains and wheels on each end of the machine are preferably staggered by arranging the same alternately on opposite sides of the plane of the speed determining sprocket chain belts and wheels, as shown in Fig. 5, so as to render the machine more compact and distribute the driving strains more uniformly.

One of the countershafts of the left hand end and one countershaft at the right hand end of the machine are operatively connected so that both sets of conveyer belts are operated in unison and at the proper relative timing. For this purpose, a horizontal equalizing shaft 35 is employed which is journaled lengthwise of the machine in suitable bearings thereon and provided at its opposite ends with bevel gear pinions 36 which mesh with bevel gear wheels 37 on the rear ends of the lowermost countershafts of both sets of conveyer belts. This equalizing shaft may be driven in any suitable manner, for instance, by an electric motor 38 having its shaft provided with a gear wheel 39 which meshes with a gear wheel 40 on the equalizing shaft, as shown by dotted lines in Fig. 1.

The side of the deflecting rollers 20 which engage the conveyer belts move in the same direction as the latter and the speed of these rollers is such that the same have a peripheral speed as great as, and preferably greater than the lineal speed of the conveyer belts with which they engage so that these rollers slip on these belts and thus insure holding the conveyer belts in proper frictional engagement with their respective driving pulleys for maintaining the movement of the several conveyer belts at the required speed.

If desired the deflecting rollers 20 may be mounted loosely on the shaft 27 in which case these rollers simply operate to deflect the conveyer belts and are turned by frictional contact with the latter.

This driving mechanism for the conveyer belts is not only simple in construction and efficient in operation, but the same also effects a considerable economy owing to the fact that hand labor may be dispensed with for rearranging the loaves on the conveyer belts to avoid getting more than one loaf at a time into the kneader and molder as has been the practice in machines of this character as heretofore constructed.

I claim as my invention:

1. An apparatus of the character described, comprising an endless conveyer belt, pulleys around which opposite turns of said belt passes, a driven sprocket wheel connected with one of said pulleys, an idle sprocket wheel, a driving sprocket wheel arranged between said driven and idle sprocket wheels, and a chain belt passing with opposite turns around said driven and idle sprocket wheels and engaging one of its stretches with said driving sprocket wheel.

2. An apparatus of the character described, comprising an endless conveyer belt, pulleys around which opposite turns of said belt passes, a driven sprocket wheel connected with one of said pulleys, an idle sprocket wheel, a driving sprocket wheel arranged between said driven and idle sprocket wheels, a chain belt passing with opposite turns around said driven and idle sprocket wheels and engaging one of its stretches with said driving sprocket wheel, and a deflecting pulley engaging with said conveyer belt and arranged concentrically with said driving sprocket wheel.

3. An apparatus of the character described, comprising a plurality of conveyer belts arranged one above the other, and means for driving said belts at successively greater speeds from the uppermost to the lowermost, comprising a driven pulley supporting one turn of each of said belts, a driven sprocket wheel connected with said driven pulley, an idle sprocket wheel adjacent to each driven sprocket wheel, a driving sprocket wheel between each driven and idle sprocket wheels, a chain belt passing around each pair of driven and idle sprocket wheels and in engagement with the adjacent driving sprocket wheel, and means for operating the several driving sprocket wheels in unison.

4. An apparatus of the character described, comprising a plurality of conveyer belts arranged one above the other, and means for driving said belts at successively greater speeds from the uppermost to the lowermost comprising a driven pulley supporting one turn of each of said belts, a driven sprocket wheel connected with said driven pulley, an idle sprocket wheel adjacent to each driven sprocket wheel, a driving sprocket wheel between each driven and idle sprocket wheels, a chain belt passing around each pair of driven and idle sprocket wheels and in engagement with the adjacent driving sprocket wheel, and means for operating the several driving sprocket wheels in unison, the several driving sprocket wheels being of the same diameter and the several driven sprocket wheels being of progressively smaller diameter from the uppermost to the lowermost.

5. An apparatus of the character described, comprising a plurality of conveyer belts arranged one above the other, and means for driving said belts at successively greater speeds from the uppermost to the lowermost, comprising a driven pulley supporting one turn of each of said belts, a driven sprocket wheel connected with said driven pulley, an idle sprocket wheel adjacent to each driven sprocket wheel, a driving sprocket wheel between each driven and idle sprocket wheels, a chain belt passing around each pair of driven and idle sprocket wheels and in engagement with the adjacent driving sprocket wheels, and means for operating the several driving sprocket wheels in unison, comprising operating sprocket wheels connected with the driving sprockets, and chain belts each passing around two adjacent operating sprocket wheels.

6. A machine of the character described, comprising a chamber having an inlet at the top for the material to be conveyed and treated and an outlet at the bottom for this material after the same has been acted upon, a plurality of endless conveyer belts or aprons arranged one above another in a vertical tier, each belt having a horizontal upper operative stretch and a lower idle stretch, pulleys supporting the opposite turns of each belt, said belts being arranged in two sets, the belts of one set alternating with those of the other set and each belt of one set having its discharge turn arranged at a distance from the receiving turn of the next lower belt of the other set, a driven sprocket wheel connected with a pulley supporting one of the turns of each belt, the driven sprocket wheels of each set of belts being progressively smaller in diameter from the uppermost to the lowermost of the respective set, an idle sprocket wheel arranged adjacent to each driven sprocket wheel, a chain belt passing around the driven sprocket wheel of each belt and an adjacent idle sprocket wheel, driving sprocket wheels of like diameter engaging with said sprocket chains, and a driving gearing for turning the several driving sprocket wheels at the same speed.

7. A machine of the character described, comprising a chamber having an inlet at the top for the material to be conveyed and treated and an outlet at the bottom for this material after the same has been acted upon, a plurality of endless conveyer belts or aprons arranged one above another in a vertical tier, each belt having a horizontal upper operative stretch and a lower idle stretch, pulleys supporting the opposite turns of each belt, said belts being arranged in two sets, the belts of one set alternating with those of the other set and each belt of one set having its discharge turn arranged at a distance from the receiving turn of the next lower belt of the other set, a driven sprocket wheel connected with a pulley supporting one of the turns of each belt, the driven sprocket wheels of each set of belts being progressively smaller in diameter from the uppermost to the lowermost of the respective set, an idle sprocket wheel arranged adjacent to each driven sprocket wheel, a chain belt passing around the driven sprocket wheel of each belt and an adjacent idle sprocket wheel, driving sprocket wheels of like diameter engaging with said sprocket chains, and a driving gearing for turning the several driving sprocket wheels at the same speed, belt gearing for operating the conveyer belts of each set in unison, and spur gearing for causing the belt gearing of both sets of conveyer belts to work in unison.

8. A machine of the character described, comprising a chamber having an inlet at the top for the material to be conveyed and treated and an outlet at the bottom for this material after the same has been acted upon, a plurality of endless conveyer belts or aprons arranged one above another in a vertical tier, each belt having a horizontal upper operative stretch and a lower idle stretch, pulleys supporting the opposite turns of each belt, said belts being arranged in two sets, the belts of one set alternating with those of the other set and each belt of one set having its discharge turn arranged at a distance from the receiving turn of the next lower belt of the other set, a driven sprocket wheel connected with a pulley supporting one of the turns of each belt, the driven sprocket wheels of each set of belts being progressively smaller in diameter from the uppermost to the lowermost of the respective set, an idle sprocket wheel arranged adjacent to each driven sprocket wheel, a chain belt passing around the driven sprocket wheel of each belt and an adjacent idle sprocket wheel, driving sprocket wheels of like diameter engaging with said sprocket chains, an operating sprocket wheel connected with each driving sprocket wheel, an operating chain belt connecting adjacent operating sprocket wheels of each set of conveyer belts, bevel gear wheels connected with corresponding driving sprocket wheels of both sets of conveyer belts, and an equalizing shaft provided with bevel gear pinions meshing with the bevel gear wheels of both sets of conveyer belts.

CHARLES H. DREHER.